US006990094B1

(12) United States Patent
O'Neal et al.

(10) Patent No.: US 6,990,094 B1
(45) Date of Patent: Jan. 24, 2006

(54) METHOD AND APPARATUS FOR NETWORK INDEPENDENT INITIATION OF TELEPHONY

(75) Inventors: Stephen C. O'Neal, San Francisco, CA (US); G. Alex Terry, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/240,434

(22) Filed: Jan. 29, 1999

(51) Int. Cl.
*H04L 12/66* (2006.01)

(52) U.S. Cl. ..................................... 370/352; 709/226

(58) Field of Classification Search ........ 370/351–356, 370/401, 389, 400–402, 465, 467, 466; 379/220.01, 379/221.14, 88.17, 210.01, 900; 709/226, 709/227
See application file for complete search history.

(56) References Cited

U.S. PATENT DOCUMENTS

| | | | |
|---|---|---|---|
| 5,764,899 A | 6/1998 | Eggleston et al. | |
| 5,809,128 A * | 9/1998 | McMullin | 379/215.01 |
| 5,850,433 A * | 12/1998 | Rondeau | 379/201 |
| 5,864,610 A * | 1/1999 | Ronen | 379/127 |
| 5,943,648 A * | 8/1999 | Tel | 704/270.1 |
| 6,014,429 A | 1/2000 | LaPorta et al. | |
| 6,130,933 A * | 10/2000 | Miloslavsky | 379/90.01 |
| 6,169,795 B1 * | 1/2001 | Dunn et al. | 379/209 |
| 6,188,673 B1 * | 2/2001 | Bauer et al. | 370/252 |
| 6,188,683 B1 * | 2/2001 | Lang et al. | 370/352 |
| 6,215,858 B1 | 4/2001 | Bartholomew et al. | |
| 6,226,285 B1 * | 5/2001 | Kozdon et al. | 370/352 |
| 6,324,264 B1 * | 11/2001 | Wiener et al. | 379/88.22 |
| 6,337,858 B1 * | 1/2002 | Petty et al. | 370/356 |
| 6,359,892 B1 * | 3/2002 | Szlam | 370/401 |
| 6,360,256 B1 | 3/2002 | Lim | |
| 6,385,191 B1 * | 5/2002 | Coffman et al. | 370/352 |
| 6,426,950 B1 * | 7/2002 | Mistry | 370/352 |
| 6,426,955 B1 * | 7/2002 | Gossett Dalton, Jr. et al. | 370/401 |
| 6,438,217 B1 | 8/2002 | Huna | |
| 6,445,694 B1 * | 9/2002 | Swartz | 370/352 |
| 6,449,646 B1 * | 9/2002 | Sikora et al. | 709/226 |
| 6,493,685 B1 | 12/2002 | Ensel et al. | |
| 6,671,061 B1 | 12/2003 | Joffe et al. | |

* cited by examiner

*Primary Examiner*—Man U. Phan
*Assistant Examiner*—Toan Nguyen
(74) *Attorney, Agent, or Firm*—Senniger Powers

(57) ABSTRACT

As apparatus and method for initiating device independent voice communication over a data network via a web interface is provided. The apparatus includes a network operations center (NOC), having a web server and a customer database. The NOC is connected to point of presence (POP) servers around the world via a data network. Telephony servers convert voice information to streaming audio format, and vice versa, for sending and receiving voice information over a data network. Device independent voice communication is established.

45 Claims, 10 Drawing Sheets

Figure 1  Related art telephone and data network connections
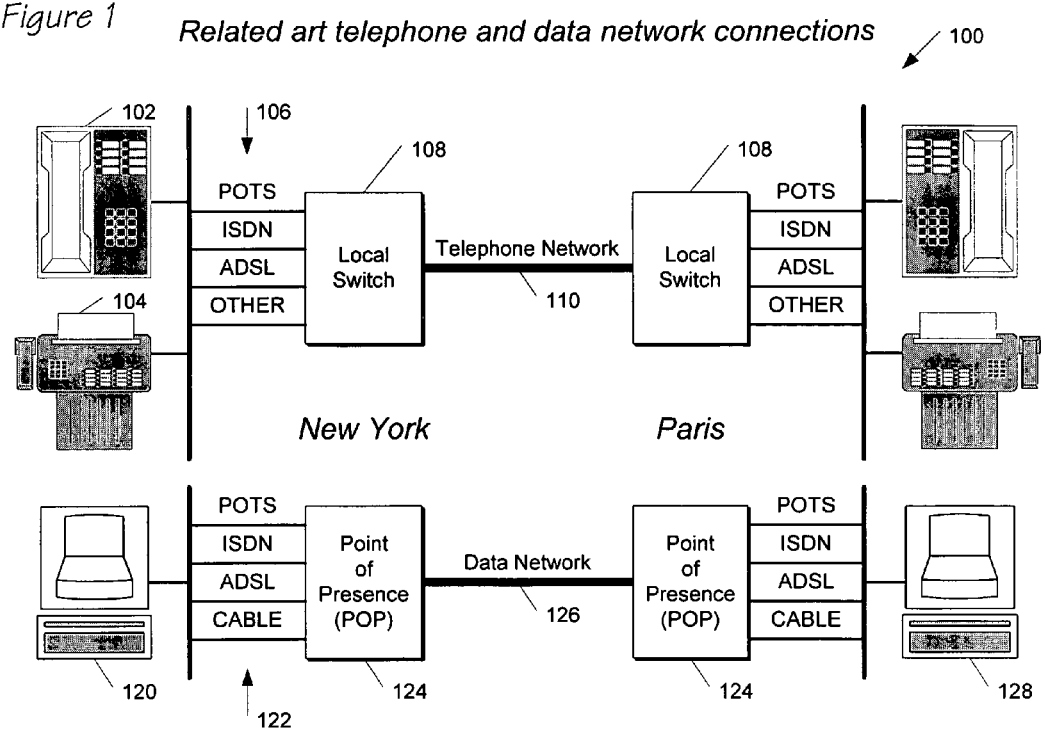
Figure 2
Data and network independent connection
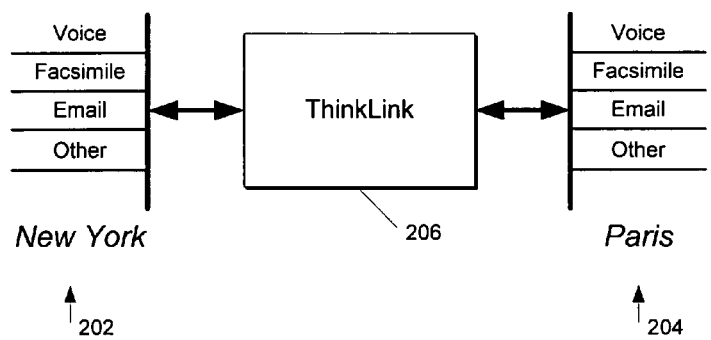

METHOD AND APPARATUS FOR NETWORK INDEPENDENT INITIATION OF TELEPHONY

CROSS-REFERENCE TO RELATED APPLICATIONS

This application is related to the following co-pending U.S. patent Applications which are hereby incorporated by reference:

| Application No. | Filing Date | Title |
| --- | --- | --- |
| Ser. No. 09/239560 | Jan. 29, 1999 | Integrated Message Storage and Retrieval System Distributed Over a Large Geographical Area |
| Ser. No. 09/240367 (Attorney Docket No. ITC1P002?) | Jan. 29, 1999 | A SYSTEM AND METHOD FOR PROVIDING UNIFIED MESSAGING TO A USER WITH A THIN WEB BROWSER |
| Ser. No. 09/907051 (Attorney Docket No. ITC1P001)? | Jan. 29, 1999 | CENTRALIZED COMMUNICATION CONTROL CENTER AND METHODS THEREFOR |
| Ser. No. 09/239584 | Jan. 29, 1999 | COMPUTER-IMPLEMENTED CALL FORWARDING OPTIONS AND METHODS THEREFOR IN A UNIFIED MESSAGING SYSTEM |
| Ser. No. 09/240893 | Jan. 29, 1999 | INTERACTIVE BILLING SYSTEM UTILIZING A THIN WEB CLIENT INTERFACE |
| Ser. No. 09/240368 | Jan. 29, 1999 | A SYSTEM AND METHOD TO MANAGE PHONE SOURCED MESSAGES |
| Ser. No. 09/240434 | Jan. 29, 1999 | METHOD AND APPARATUS FOR NETWORK INDEPENDENT INITIATION OF TELEPHONY |
| Ser. No. 09/240435 | Jan. 29, 1999 | APPARATUS AND METHOD FOR DEVICE INDEPENDENT MESSAGING NOTIFICATION |
| Ser. No. 09/874457 | Jan. 29, 1999 | APPARATUS AND METHOD FOR CHANNEL-TRANSPARENT MULTIMEDIA BROADCAST MESSAGING |
| Ser. No. 09/239589 | Jan. 29, 1999 | Voice Access Through a Data-Centric Network to an Integrated Message Storage and Retrieval System |

DEFINITION OF TERMS

Data-centric network: a network that carries digital data, primarily to facilitate information exchange among computers and computer peripherals. Examples include distributed computer networks such as the Internet.

Telephony-centric network: a network that carries telephony information such as voice, fax, page messages, and the like, primarily to facilitate information exchange among telephony devices.

Message: a communication which may be transmitted via either the data-centric network or the telephony-centric network. Examples include voicemail, e-mail, facsimile, page, and the like.

Telecommunication device: POTS telephone, cellular telephone, satellite telephone, web telephone, PC (desktop and laptop), web surfer, personal digital assistant (PDAs), facsimile machine, teletype, modem, video telephone, set top telephone.

Web telephone: a telephone implemented via a computer that is coupled to the data-centric network. An example is a PC with microphone, speaker and internet connection.

Set top telephone: a telephone set coupled to a cable-based set top box, bypassing the local telco provider. The cable-based system may be provided by, for example, WebTV, TCI cablevision.

Web surfer: an Internet-ready PC with a network connection and pre-installed web browser.

PDA: personal digital assistant, e.g., Palm Pilot available from 3COM.

Thin Web Client: A commonly employed web browser such as Internet Explorer or Netscape Navigator—JAVA enabled.

PSTN: Public Service Telephone Network, e.g., AT&T, MCI, Sprint-owned telco

GUI: graphic user interface

POTS: plain old telephone service

NOC: Network Operations Center

POP: point of presence, e.g., co-location at a local telco switch or at a company controlled area with T1 connections to a local switch.

WPOP: Web POP

VPOP: Voice POP

BACKGROUND OF THE INVENTION

1. Field of the Invention

This invention relates in general to the field of telephonic communication, and more specifically to initiation of communication between two or more end points whose communication channel is network independent.

2. Description of the Related Art

The term telephone (from the Greek roots tele, "far," and phone, "sound") was the first used to describe any apparatus for conveying sound to a distant point. Specifically, the word was applied as early as 1796 to a megaphone, and not long afterward to a speaking tube. The name string telephone was given some years after its invention (1667) to a device in which vibrations in a diaphragm caused by voice or sound waves are transmitted mechanically along a string or wire to a similar diaphragm that reproduces the sound. Still later, devices employing electric currents to reproduce at a distance the mere pitch of musical sounds were called telephones. Nowadays, the name is assigned almost exclusively to apparatus for reproducing articulate speech and other sounds at a distance through the medium of electric waves. The term telephony covers the entire art and practice of electrical speech transmission, including the many systems, accessories, and operating methods used for this purpose. Telecommunications broadens the concept still further to cover all types of communication including computer data, voice and facsimile.

In 1876, Alexander Graham Bell successfully transmitted words using a variable resistance transmitter. In the 19$^{th}$ century, a very short time after the introduction of Bell's device, telephony provided connections to a relatively large number of users over relatively short distances. Today, telecommunications networks encompass a number of differing technologies just to establish a voice connection from point A to point B. For example, an end user is usually connected by way of a loop (twisted pair) to a local telephone exchange. The local exchange is then connected via a hierarchy of switching centers. The connection between the centers is called a trunk, which consists physically of cable, coax, fiber optic or microwave radio links. To connect from an end point in one city to an end point in another city the order of connection is as follows. The first end point connects with a local toll center, which in turn connects to a primary center. If the receiving end point is managed by this primary center, the call is directed to a local toll center for the recipient, and ultimately to the receiving end point. If the primary center does not manage the receiving end point, the call is passed to a sectional center. The sectional center then passes the call to a regional center to be passed back down to another sectional center, then to a primary center, and eventually to the local center responsible for the recipient end point.

Once a call leaves the local center to reach a recipient end point, the call is tagged as long distance, and the user who initiates the call is charged. Thus, for all long distance voice communication today, a user will be billed for the connection, by a long distance company who has contractual rights for time on the trunks.

In contrast to this scenario, modern data communications between computers is typically provided via data networks, rather than telephone networks, where charges are associated with the speed of the connection, and the quantity of data transferred over the connection. That is, end to end connection between computers is provided over a relatively cost free data network, commonly referred to as the internet. However, the types of connections available over the internet are typically associated with computer data types such as email, web pages, etc. Although some development has been made to encode voice information for transfer over the internet, unified messaging (voice, email, fax) over a data network is still unavailable. In addition, even where voice, email and fax messaging is available, there is a strict correlation between end point communication devices that must be maintained. That is, a telephone must communicate with another telephone, a fax machine with another fax machine, and an email client with another email client. So, a voice capable computer is unable to communicate with a remote telephone, because the two devices are communicating over separate networks (telephone and data).

What is needed is a method and apparatus that allows communication devices to be connected, regardless of the type of device desiring the connection, and regardless of the typical network upon which the device communicates. In addition what is needed is the ability to initiate voice communication, and voice conferencing, utilizing a data connection to select the end devices. Such an apparatus and method would allow cost free long distance voice connections, using a data network, from either computing, or telephony devices, initiated by either a computing or telephony device.

SUMMARY

To address the above-detailed deficiencies, the present invention provides an apparatus for web initiated telephony between telephonic devices. The apparatus includes a computer and a plurality of POP telephony servers. The computer has a data connection to a web server, to initiate a telephony connection between a telephony devices. The point of presence (POP) telephony servers are coupled to a telephone network, and to the web server, to connect to the telephonic devices upon command by the web server. The command by the web server is initiated by a user controlling the computer.

In another embodiment, the present invention provides a system for establishing voice communication between a first and a second telephone device, both coupled to first and second telephone networks. The communication is initiated by a computing device coupled to a data network. The system includes first and second telephony servers, a web server and a computing device. The first telephony server is coupled to the first telephone network and to the data network. The second telephony server is coupled to the second telephone network and to the data network. The web server is coupled to the first and second telephony servers via the data network. And, a computing device is coupled to the data network, to make a selection of the first and second telephone devices for communication, and to provide the selection to the web server. Upon receipt of the selection from the computing device, the web server commands the first and second telephony servers to call the first and second telephone devices, respectively, and to establish voice communication between them.

In yet another embodiment, the present invention provides a long distance communication system for establishing voice communication between two or more telephony devices, each coupled to a telephone network, the communication system utilizing a data network as the long distance transmission medium. The communication system includes POP servers, a web server and a communication initiation device. The point of presence (POP) servers are coupled to a local telephone network, and to the data network. The web server is coupled to the plurality of POP servers via the data network, and is configured to receive information associated with the telephony devices, and to select one or more POP servers to establish voice communication between the telephony devices. And, the communication initiation device is coupled to the web server via the data network to provide selected information associated with the telephony devices to the web server.

Another aspect of the present invention provides a method for initiating voice communication between two telephony devices, utilizing telephone networks for local communication, and a data network for long distance communication. The method includes: a) selecting the two telephony devices to be connected; b) providing information associated with the two telephony devices to a web server; c) associating local telephony servers with the provided information; and d) commanding from the web server that the associated local telephony servers establish communication with their associated telephony device wherein voice communication between the two telephony devices is established by the web server.

BRIEF DESCRIPTION OF THE DRAWINGS

These and other objects, features, and advantages of the present invention will become better understood with regard to the following description, and accompanying drawings where:

FIG. 1 is a block diagram of both a telephone network and a data network interconnecting end points between two cities.

FIG. 2 is a block diagram of a network independent communication channel according to the present invention.

DETAILED DESCRIPTION

Figure 3:
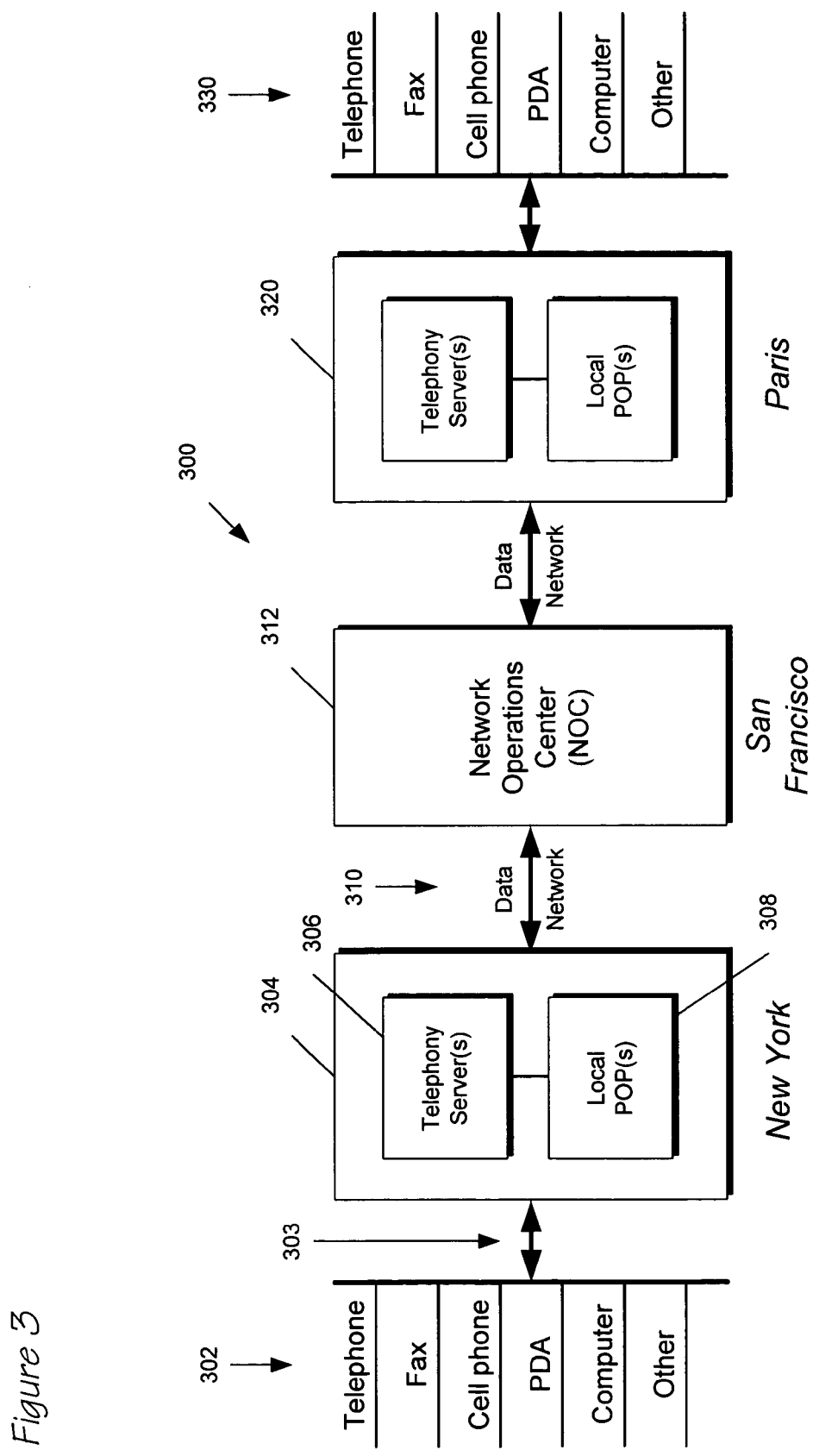
FIG. 3 is a block diagram of a data network communication system according to the present invention.

Referring to FIG. 1, a block diagram 100 is shown of a related art telephone network 110 and a related art data network 126. The telephone network 110 provides for transmission of communication between local switches 108, which are connected to telephony devices, such as a telephone 102 or a fax machine 104. One skilled in the art will appreciate that the telephone network 110 between the local switches 108 may consist of land lines (coax or fiber optic), line of sight microwave, or even satellite communications. However, from the local switch 108 to the end communication devices 102, 104, connections are typically made via a twisted pair, referred to as plain old telephone service (POTS). More recent communication channels from the local switch 108 provide for faster and cleaner transmission. These include Integrated Digital Service Network (ISDN) and Asynchronous Digital Subscriber Line (ADSL) technologies. These technologies, however, still communicate between essentially voice front ends, to a local switch 108, for access to the telephone network.

In operation, if an end user wishes to place a telephone call, s/he initiates the call using a telephone 102. The telephone 102 passes the telephone number to be called through the local switch 108, ultimately reaching a telephony device at the receiving end. At both ends of the call, communication is provided by the local switches 108. If the call is local, the user is typically not charged for the time s/he spends on the telephone. However, if the caller that initiates the conversation is in say, New York, and the recipient of the call is in Paris, the caller that initiates the conversation is typically charged. a long distance fee, from a long distance provider who either owns, or leases access to the telephone network 110.

If the type of information to be transferred is neither voice, nor fax, but is instead computer generated electronic information, communication between devices may be established over a data network 126. Examples of data networks 126 include local area networks (LAN's), wide area networks (WAN's), and the internet. If the Data network is a LAN or a WAN, access to the network is typically provided via a hub or router (not shown) connected to one or more data servers (not shown). However, if the connection desired is outside of the LAN or WAN, communication is generally provided via typical telephone connections 122 (as above), coupled to a point of presence POP server 124. The POP server 124 is coupled to a data network 126, such as the internet.

In operation, if a computer 120 wishes to communicate to a second computer 128, a connection between the computers 120, 128 is established via POP servers 124 over the data network 126.

While the telephone network 110, and the data network 126 are schematically shown in FIG. 1 with similarities, the type of information that is transmitted over the networks is very different. The telephone network 110 is optimized to carry primarily bi-directional voice communication (albeit digitized), while the data network 126 is optimized to transmit and receive computer data, asynchronously. The telephone network 110 does provide for transfer of information other than voice, but the devices that communicate over the telephone network 110, such as the fax machine 104, have been specifically designed to accommodate the essentially analog nature of the service.

In addition, when communicating from New York to Paris over the telephone network 110, a call initiator must contract for, and pay a long distance carrier for the privilege. In contrast, a computer user in New York can communicate with a computer in Paris, for example, without incurring any long distance charges. In fact, the only charges that will be incurred by computer user will be local telephone line charges to connect to his/her local POP 124. But, communication from the local POP 124 to any other POP 124 in the world is cost free to the user. This has made communication over the data network 126 very desirable. However, at present, the types of communication provided for via the data network 126 are predominantly for computer data (i.e., communication from computer to computer).

Referring now to FIG. 2, a block diagram 200 is shown illustrating the present invention which provides for communication between endpoints 202 and 204 that is essentially independent of either data type, or network type. Each end point 202, 204, say New York and Paris, may communicate with each other in any of a number of data types, such as voice, facsimile, email, or other analog or digital form, using end devices such as a telephone (analog or cell phone), fax machine, computer, personal digital assistant (PDA), or other device, via a ThinkLink interface 206. In addition, the device type at one endpoint 202 need not correspond to the device type at another endpoint 204. That is, the ThinkLink interface 206 allows bi-directional communication to be established between say a telephone and a computer. In addition, the ThinkLink interface 206 allows a user to designate how s/he wishes information to be transmitted or received, regardless of the original format of the information. For example, if the information at one end of a connection is transmitted via email, a user may select to have that email converted into voice information for delivery to a telephone. Or, a user may wish to have faxes delivered via email, rather than to a physical fax machine. The ThinkLink interface 206 therefore not only connects all device types to a data network for delivery, but also provides conversion of differing data types, as is specified by a user. This will be more particularly illustrated below with reference to FIG. 4. The ThinkLink interface 206 is more particularly illustrated in FIG. 3, to which attention is now directed.

FIG. 3 provides a block diagram of the ThinkLink interface 300. More specifically, the block diagram 300 illustrates a number of different communication devices 302 coupled to a communications server 304 via modem voice or data connections 303. For example, the connection to the communications server 304 from the communication devices 302 could be POTS, ISDN, ADSL, cable modem, LAN or WAN. The communication devices 302 include telephone, fax, cell phone, personal digital assistant (PDA), computer, or any other telephony or data device compatible with existing or future telephone or data networks. The communications server 304 is then coupled to a network operations center (NOC) 312 via a data network 310. A second communications server 320 is shown connected to the NOC 312 via a data network to illustrate connectivity between the devices 302 and other remote devices 330. One skilled in the art will appreciate that while only two server connections are shown to the NOC 312, many other connections are provided. In fact, the number of data connections provided by the NOC 312 is essentially without limit, albeit concurrent connections may be limited by the bandwidth of the data network 310.

Within the communications server 304 are a telephony server 306 and a data server, or local POP 308. The telephony server 306 and the data server 308 may be provided by a single computer executing two applications (telephony and data), or in the alternative, may be two or more distinct computers executing their own applications (telephony and data). In fact, the configuration of the telephony and data servers 304, 306 may very from city to city depending on the number of communication devices requiring access to the communications server 304.

In operation, communication devices 302 that typically communicate over existing telephone networks (telephone, fax, etc.) connect to the communications server 304 via the telephony server 306. Other devices 302 that communicate over an existing LAN, WAN, etc., may communicate directly to the data server 308. However, once a communication device 302 connects to a local communications server 304, whatever the type of communication (voice, fax or data), all communication is routed over the data network 310 through a network operations center 312 in the form of internet data. For example, if a user in New York using a voice capable computer wished to call a telephone in Paris, a connection between his computer 302 and his local data server 308 would be established. The call would be routed directly from POP to POP over the data network to a local communications server in Paris. However, the NOC 312 would initiate the connection by providing directory services for the POP. A call would then be placed by the telephony server in Paris to the telephone in that city. Voice communication would then be established over the data network 310, through the NOC 312, from New York to Paris. One skilled in the art should appreciate that this voice connection, established over the data network 310, is essentially cost free in terms of long distance charges to the user by a telephone company.

Figure 4:
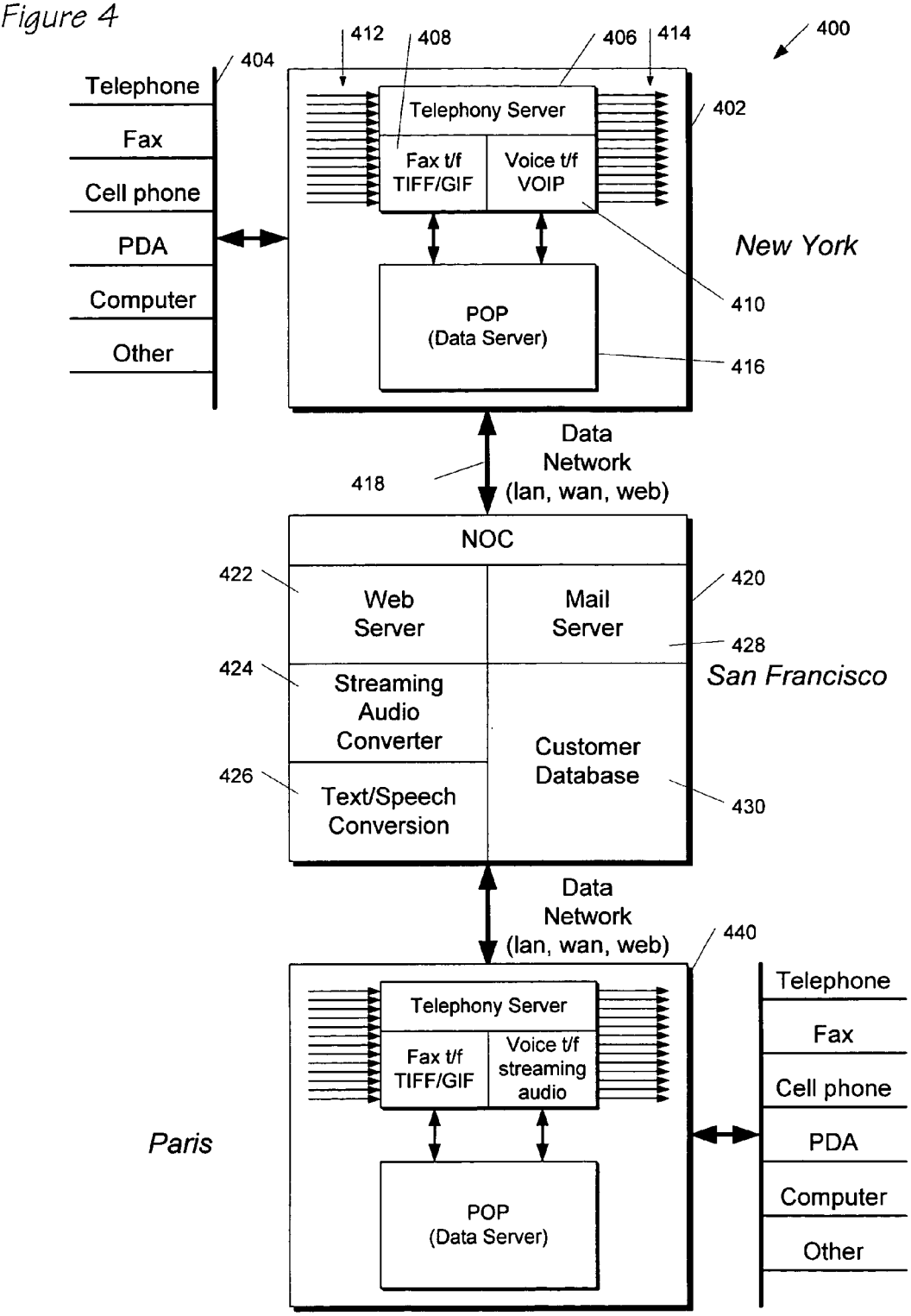
FIG. 4 is a block diagram illustrating connection of remote point of presence (POP) servers with a network operations center (NOC), according to the present invention.

Referring now to FIG. 4, a more detailed block diagram of a ThinkLink interface 400 is shown. The diagram 400 illustrates a number of different communication devices 404 connected to a communications server 402. The communications server 402 is coupled to a NOC 420 via a data network 418. The NOC 420 is also connected to other communications servers 440 via the data network 418. Within each communications server 402 are a telephony server 406 and a data server 416. The telephony server 406 is connected to typical phone connections (i.e., twisted pair, coax, T1, etc.) to provide connection between the communication server 402 and communication devices 404 that typically communicate over a telephone network. Such devices include telephones, fax machines, cell phones, etc. In one embodiment, a telephony server 406 is coupled to 2 T1 lines providing access to 48 phone lines, for inbound 412 or outbound 414 communication. These 48 phone lines may be dedicated to voice, fax, pager, etc., or may be dynamically allocated as demand varies. Within the telephony server 406 are two conversion applications: a Fax to/from TIFF/GIF converter 408, and a voice to and from voice-over-internet-protocol (VoIP) 410. The Fax converter 408 is capable of taking a fax that has been received by the telephony server 406, and convert the fax images into either TIFF or GIF format, for transmission over the data network 418. In addition the fax converter 408 can receive TIFF or GIF formatted images from the data network 418 and convert them into a fax format for transmission by the telephony server 406 to a fax device 404.

The voice converter 410 converts voice information received from the telephony server 406 into voice-over-internet-protocol (VoIP, typically H.323) for transmission over the data network 418 In addition, VoIP received from the data network 418 is converted into voice format for delivery by the telephony server 406 to a voice capable device 404 (such as a telephone or voice capable computer).

By using the fax converter 408 and the voice converter 410, the telephony server 406 provides bi-directional transmission of information between typical telephony devices 404 and other remote devices accessible via a data network 418 (such as a LAN, WAN or internet).

The NOC 420 contains a web server 422, a streaming audio converter 424, a text/speech converter 426, a mail server 428, and a customer database 430. Each of these will be discussed in greater detail below.

The web server 422 provides a front end interface for a user with a data connection to the NOC 420. The web server 422 allows a user to configure and control telephony and data connections from any device capable of accessing the internet (such as a computer, a set top box, etc.) Examples of such controls will be discussed below with reference to FIGS. 6–9.

The streaming audio converter 424 provides a user with the ability to convert data received in streaming audio format into other formats that s/he prefers. One example would be Real Audio format. Thus, if a user desired to receive voice information in the form of Real Audio sent to his/her computer, the streaming audio converter 424 would convert the information to Real Audio format prior to delivering it to the user's local communications server 402.

The text/speech converter 426 provides the ability to convert text, such as email, into streaming audio, or streaming audio into text. Operationally, this allows a user to have email converted to voice information for delivery to a telephone, for example. Alternatively, information transmitted by a user in the form of voice, and ultimately streaming audio format, could be converted to text for delivery as an email.

The mail server 428 provides an email interface for a user to send/receive email, either from an account established on the NOC 420, or alternatively to poll another email account for maintenance by the NOC 420. For example, a user may have an email account on the NOC at address joe@thinklink.com. In addition, the user may have another email account as joe@isp.com. The mail server 420 provides the user with the ability to receive all joe@thinklink.com email in one folder, and can also poll an external server to obtain mail delivered to joe@isp.com.

The customer database 430 provides information within the NOC 420 regarding rules, address books, and other configuration information related to a particular user of ThinkLink. Such information will be described with reference to FIGS. 6–8.

To recap, the ThinkLink interface 400 provides the ability to communicate between remote devices, that may create data in different formats (voice, email, etc.), over a data network 418, without incurring long distance charges associated with the telephone network. In addition, the ThinkLink interface provides a user with the ability to initiate communication between remote end devices directly from the data network. The term used by the inventors for this novel feature is web initiated telephony. A couple of examples of this will now be described with reference to FIG. 5.

Figure 5:
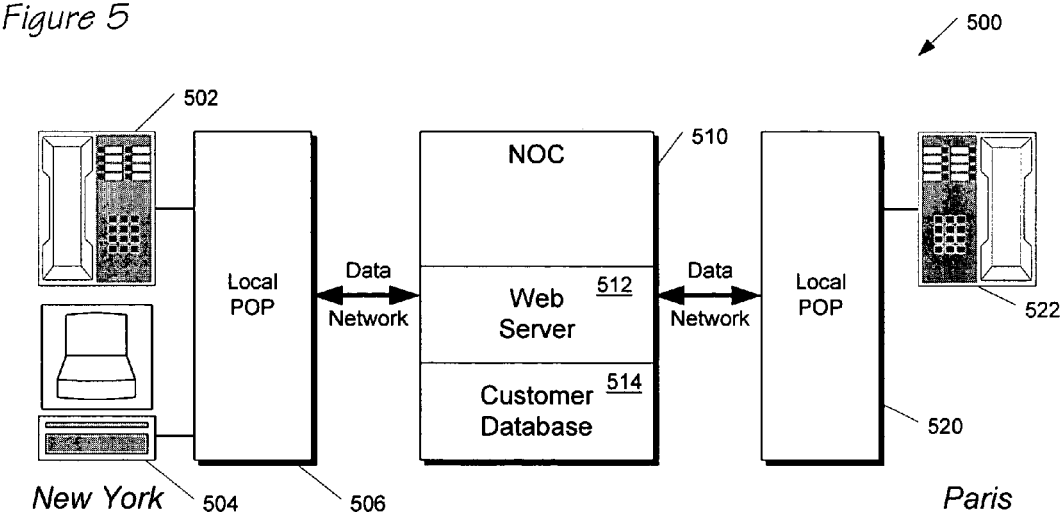
FIG. 5 is a block diagram illustrating data network initiated telephony according to the present invention.

Referring to FIG. 5, a block diagram 500 is shown of communication devices 502, 504 and 522 connected via a ThinkLink interface. More specifically, a telephone 502 and a computer 504, located in New York, are connected to a local data server 506. The telephone 502 and the computer 504 may be connected to the local data server 506 over separate POTS lines, over a single ISDN line, or perhaps distinctly, such as by connecting the telephone 502 over a POTS line, and the computer 504 via a cable modem. The local server 506 is similar to that described above in FIG. 4. The local server 506 provides connection for the telephone 502 and the computer 504 to a NOC 510, and thus to any other communication device, via the data network.

The NOC 510 contains a web server 512 and a customer database 514. Other elements of the NOC 510 have been left out of FIG. 5 for ease of discussion. Operationally, if a user at a computer 504 in New York wished to establish voice to voice communication between his/her telephone 502, and a telephone 522 in Paris, the following sequence would occur. The user would select the two telephone numbers to be dialed, one associated with the telephone 502, the other associated with the telephone 522. The user selects these numbers from a customer database 514 via connection to the NOC 510 from his/her computer 504. Once the numbers are selected, the user initiates the call. The NOC 510 establishes a data connection with the local server 520 in Paris and the local server 506 in New York. In addition, the NOC commands each of the local servers 506, 520 to dial the telephones 502, 522 using the selected telephone numbers. When the telephones 502, 522 are answered, voice communication is established between them through the NOC 510 via the data network. More specifically, the voice information provided by each telephone 522 is converted into streaming audio, transmitted over the data network to the other data server, converted back to voice format, and provided to the end device. In this scenario, the telephone conversation was initiated by the computer 504, over a data network.

An alternate example would be the following. A user in Paris could connect to the NOC 510 from his/her telephone 522. Utilizing a series of touch tone menu commands, the user could access his ThinkLink address book in the customer database 514 and could select the IP address of a voice capable computer 504. The user could have the NOC 510 call the computer 504 to establish a voice connection. The NOC 510 would communicate with the data server 506, and then to the computer 504 using the IP address of the computer 504. If a user were sitting at the computer 504, a voice connection could be established with the user in Paris, via the data network.

In both of these examples, communication between end points is initiated and controlled by a server on a data network, rather than by a long distance telephone network. In addition, the type of the device initiating the communication is not restricted to telephony devices, but also extends to any device interfacing the web server 512.

Figure 6:
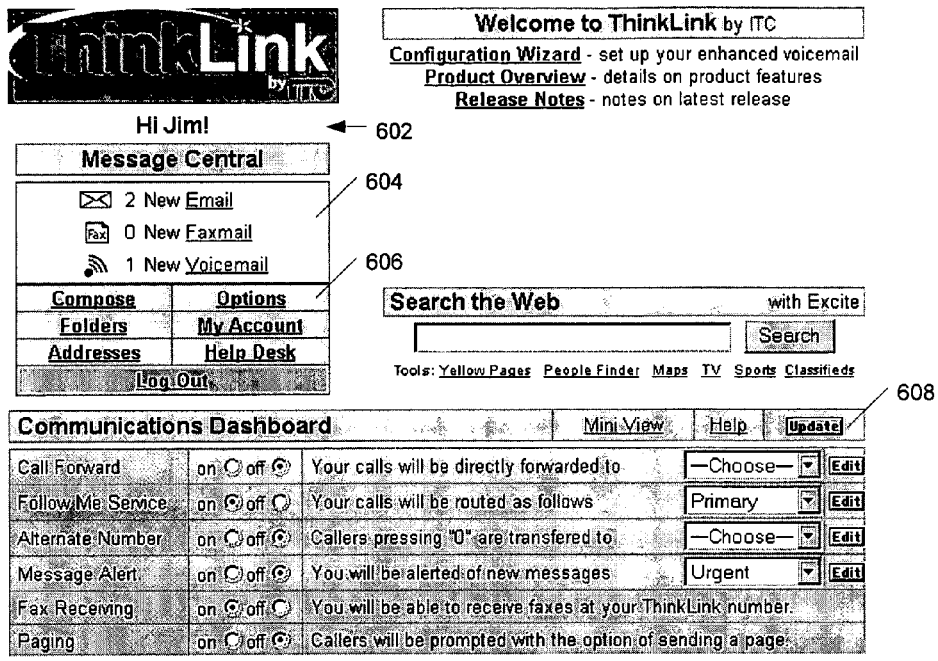
FIG. 6 is a screen capture of a display interface of the ThinkLink service, according to the present invention.

An exemplary interface to the web server 512 will now be described with reference to FIGS. 6–8 to which attention is now directed. FIG. 6 contains a screen shot 600 of the ThinkLink web interface. Access to the web server 512 may be provided by any device capable of connecting to the internet. Such devices now include personal computers, PDA's and set top boxes, but others are anticipated in the future.

Once an account is established with ThinkLink, a user logs onto the web server 512. Note: an account typically provides a user with a telephone number, a fax number, and an email address. These contact numbers, and email address may then be provided to friends, family, clients, etc., to reach the user. If the user is not available, messages, in the form of voicemail, fax or email may be left with the web server 512.

When a user logs onto the web server 512, it recognizes the user and provides him/her with a welcome screen 602. In addition, a message control box 604 is provided to notify the user of any messages received by the web server 512. Such messages may be in the form of voicemail, fax or email. If the user wishes to examine new messages, s/he simply clicks on the corresponding hyperlink text, and is taken to a message area applicable to the message type. In FIG. 6, Jim is shown to have 2 new email messages, 1 new voice message, and 0 faxes.

Below the message control 604 are menu commands 606. These allow a user to configure ThinkLink to manage his/her account according to predefined criteria. Of particular interest to the present application is the ability to create an address book to be maintained in the customer database 514. This will be described below with reference to FIG. 7.

In addition, a communications dashboard 608 is provided. The communications dashboard 608 allows a user to configure how the ThinkLink system acts when receiving messages. For example, if a user receives a telephone call to his/her ThinkLink number, he can have it automatically forwarded to a different telephone. If the user is traveling, for example, upon arrival at each destination, the user could access his configuration, via a computer or a telephone, and could change his configuration to forward all calls to his new destination.

Alternatively, a user may wish for ThinkLink to record is messages, either fax, email or voice, but may wish to be alerted via pager, email, fax, or telephone when particular messages arrive. All of the scenarios regarding configuration of the ThinkLink interface are beyond the scope of the present application, and will not be discussed further. However, of particular interest to the present application is configuration of the address book within the customer database 514.

Figure 7:
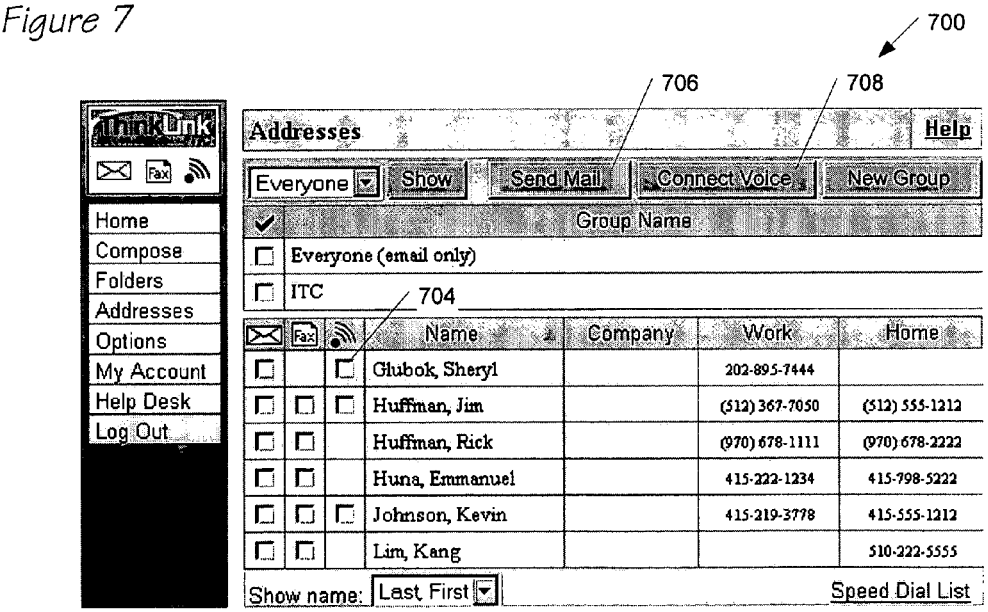
FIG. 7 is a screen capture of a display interface of an address book within the ThinkLink service.

Referring now to FIG. 7, a screen shot is shown of an address book 700 within the customer database 514. The address book 700 is provided after a user selects the Addresses hyperlink button in the command area 606. The address book 700 contains contact information for an infinite number of individuals that have been recorded by a user. In addition, the address book 700 contains selection boxes 704 for selecting types of communication to be established with particular users, as well as call initiation buttons 706, 708. That is, a user may select particular individuals to call, using the selection boxes 704, and may initiate the call, either via email 706, or via voice connection 708. This will be particularly described below with reference to FIG. 9.

Figure 8:
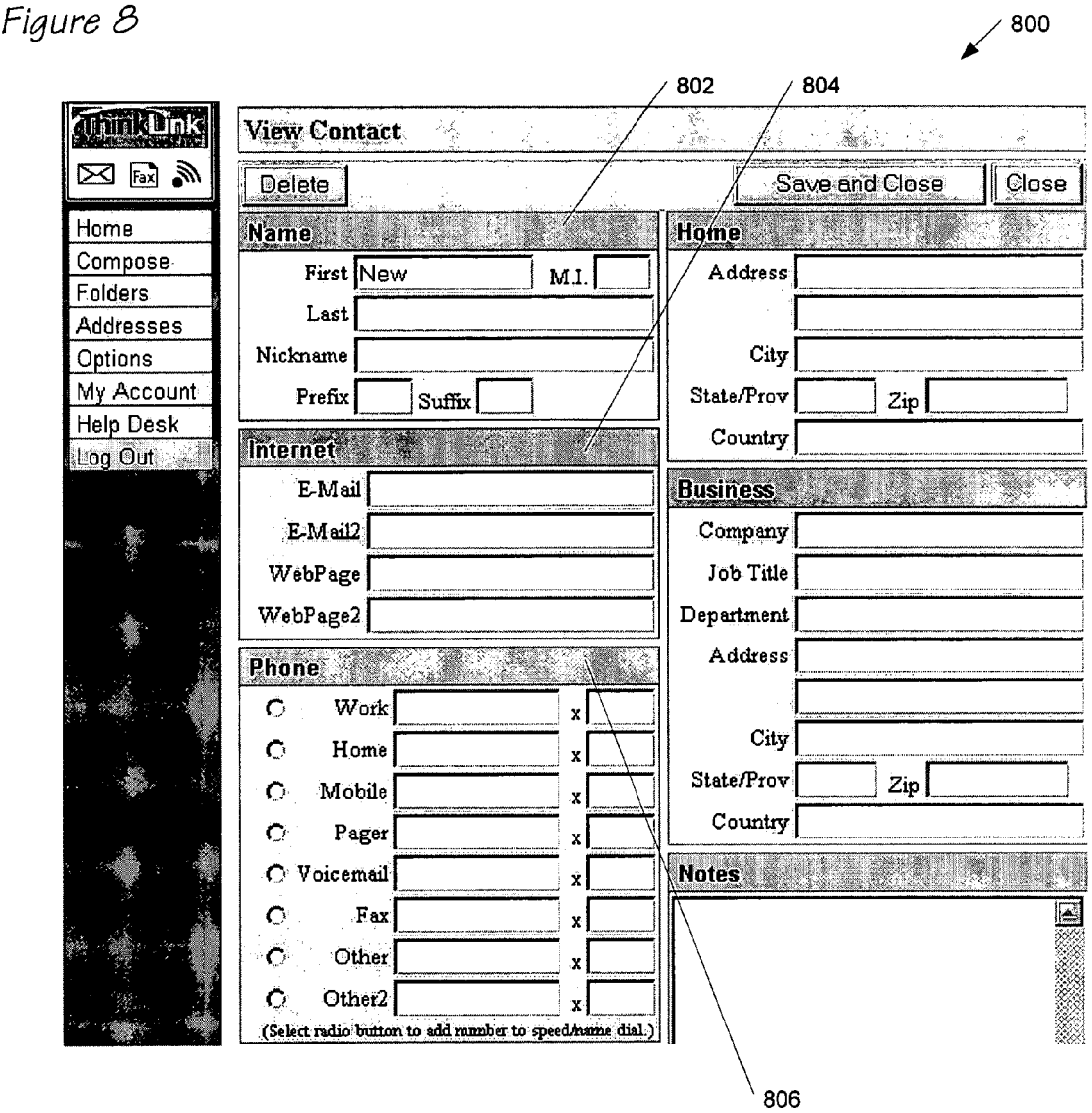
FIG. 8 is a screen capture of a portion of a display interface of a contact record within the address book of FIG. 7.

Referring now to FIG. 8, a screen shot of a contact record 800 is provided. The contact record includes name information 802, internet contact information 804 (for accessing a contact via an IP address, or via email), and telephony contact information 806 (for contacting an individual via telephone, fax, pager, etc.).

Figure 9:
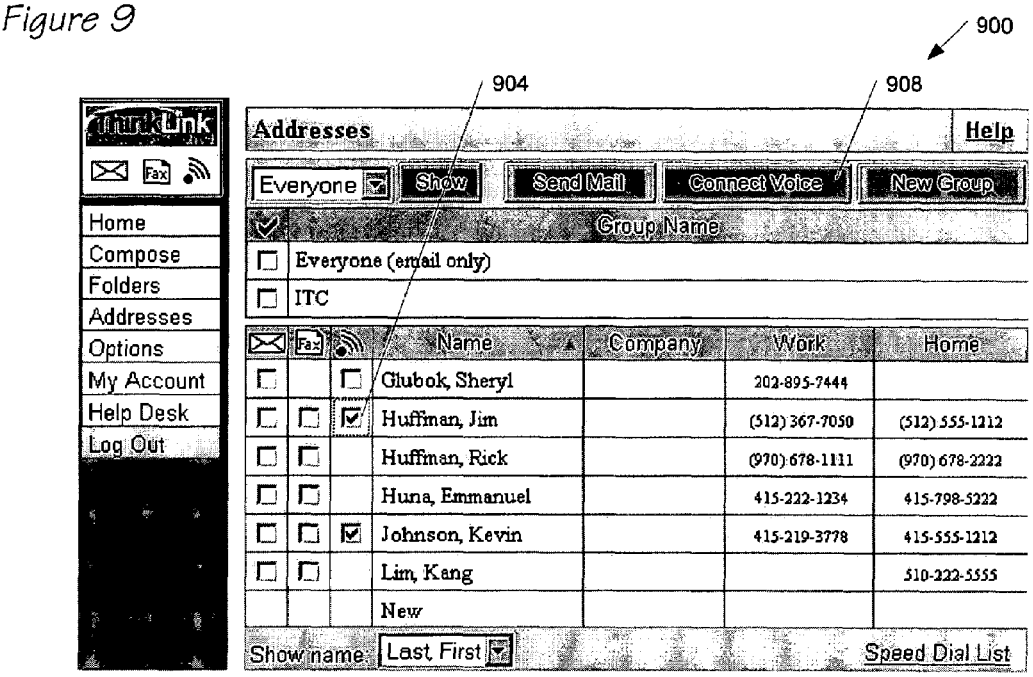
FIG. 9 is a screen capture similar to FIG. 7 wherein selection of contacts is made for initiation of telephony.

Referring to FIG. 9, a screen shot is shown of an address book 900, similar to that described above with reference to FIG. 7. However, in this case, a selection has been made to connect contact Huffman with contact Johnson. In addition, checks have been placed in selection boxes 904 to indicate that a telephony connection is to be established between the two contacts. Depending on how the user configured the contact information in the contact record (not shown), telephony may be established with between home telephones, work telephones, mobile telephones, PDA's, or even computers via IP addresses. Once the user designates which contacts are to be connected, and what type of connection is to be established (in this case it is a voice connection for both contacts), the user initiates the communication by selecting the command button 908 "connect voice". Operation of how the web initiated communication is established will now be described with reference to FIGS. 5 and 10.

Figure 10:
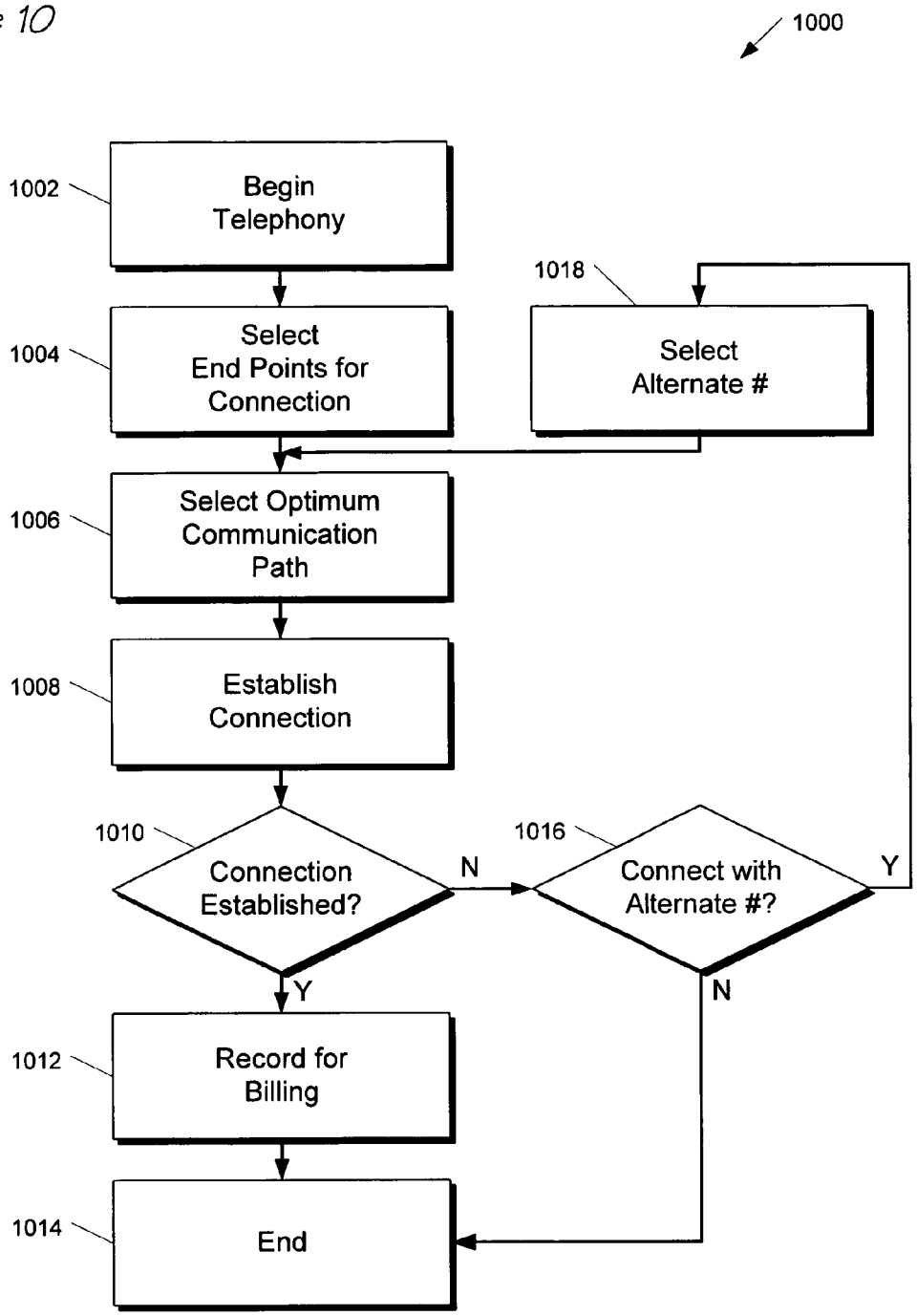
FIG. 10 is a flow chart illustrating the method of the present invention for initiating telephony via a data network.

Referring first to FIG. 10, a block diagram 1000 is provided to illustrate how web initiated telephony is performed. The process begins at block 1002 and proceeds to block 1004.

At block 1004, a user selects the end points for connection, as described in FIG. 9. Flow then proceeds to block 1006.

At block 1006, the NOC 510 reviews the user's selections and determines what the optimum communication path is between the contacts. In many cases, this will simply be determining the IP address of the local data server closest to each end point. Flow then proceeds to block 1008.

At block 1008, the NOC 510 communicates with each local data server 506, 520 to initiate the local call. Flow then proceeds to decision block 1010.

At decision block 1010, a determination is made as to whether a connection is established. If a connection is established, flow proceeds to block 1012. If no connection is established, flow proceeds to decision block 1016.

At block 1012, a connection is established between the two selected endpoints, using the local data servers 506, 520, initiated by a user interfacing to the web server 512. At this point, the web server begins records the time, length, etc., of the conversation, both for the user's records, and for billing, depending on the user's contract with ThinkLink. Flow then proceeds to block 1014.

At block 1014, the contacts terminate their conversation. The link between the local data servers 506, 520 is terminated, and the call is over. At this point it should be appreciated that communication between two remote devices has been established via a web interface, over a data network, with no restriction as to either the type of end device, or requiring long distance access to a telephone network.

At decision block 1016 a determination is made as to whether the user wishes to connect alternate numbers. Recall, a user reaches decision block 1016 when a connection is not established between selected end points. When this occurs, the user is alerted, either via a windows prompt on his data device, or a message on his telephony device. If s/he wishes to connect to alternate #'s, flow proceeds to block 1018. Otherwise, flow proceeds to block 1014 where the communication ends.

At block 1018, the user is given the opportunity of selecting alternate #'s for connection. Once selected, flow proceeds back to block 1006.

Figure 11:
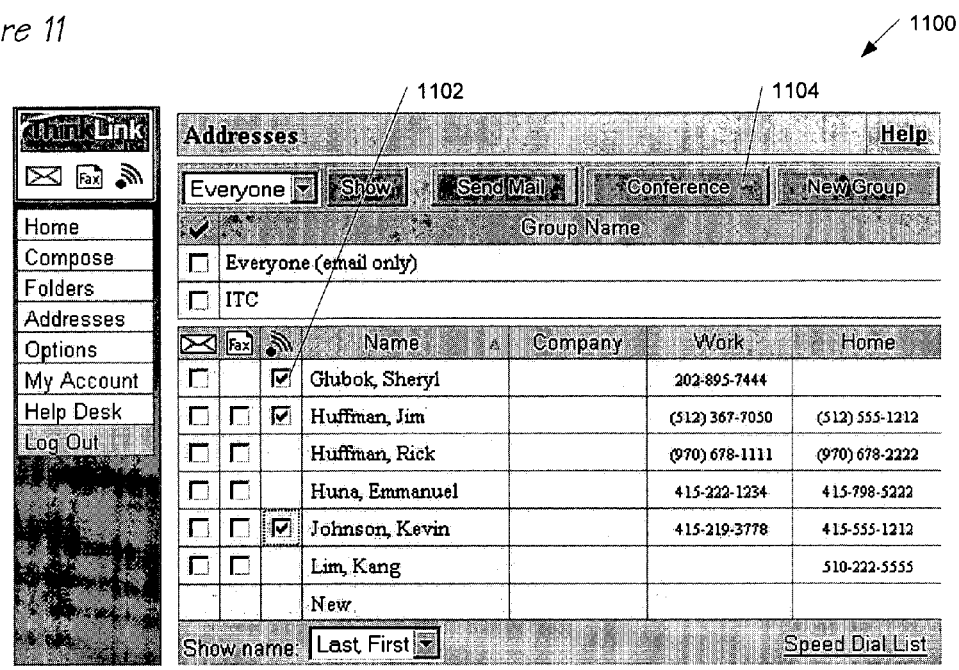
FIG. 11 is a screen capture similar to FIG. 9 wherein selection of multiple contacts is made for initiation of a telephonic conference.

Referring now to FIG. 11, an example will be provided that illustrates how ThinkLink allows for web initiated telephone conferencing. FIG. 11 shows an address book 1100 containing multiple contact records. Selection boxes 1102 are shown next to the contact records, and in screen 1100, three contacts are shown with checks next to their voice numbers. Recall that these voice numbers may be related to any device capable of sending and receiving voice communication over either a telephone network or a data network. When 3 or more contacts are selected, a conference button 1104 is provided. When a user selects the conference button 1104, the web server 512 initiates a telephone conference between the three contacts, as shown in FIG. 12.

Figure 12:
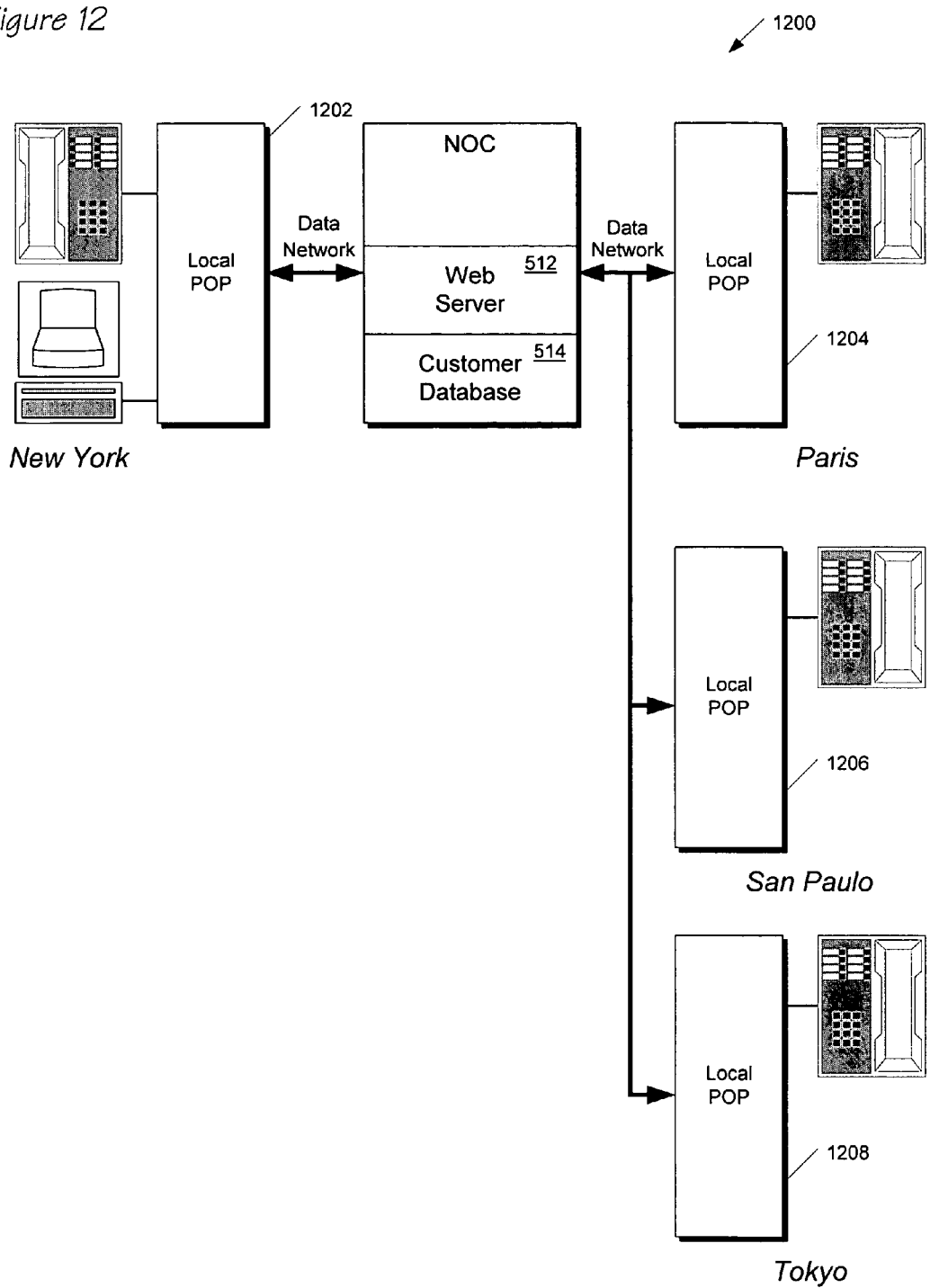
FIG. 12 is a block diagram of a network according to the present invention illustrating network independent telephonic conferencing between multiple POP's.

Referring to FIG. 12, a block diagram 1200 is shown, similar to that described above with reference to FIG. 5. The diagram 1200 includes a local data server 1202 in New York, and data servers 1204, 1206, and 1208 in Paris, San Paulo, and Tokyo, respectively. When a user initiates a conference with 3 or more individuals, the web server 512 establishes communication with a local data server closest to each contact, and commands the local server to establish a telephony connection with a selected number. Establishment of the connection with each contact in the conference operates similar to the flow chart of FIG. 10. In this instance, all communication is initiated from a device on the data network, without regard to the type of end devices in the conference.

Although the present invention and its objects, features, and advantages have been described in detail, other embodiments are encompassed by the invention. For example, the scenarios described above, for two way telephony, and for conferencing, utilize existing technologies for voice communication. However, the inventors anticipate that other voice capable technologies will be developed that will connect either to existing telephone networks, or possibly to data networks, utilizing existing information formats, or possibly with new and different data formats. The novelty of the present invention is not restricted to the device types, or the way they are connected to a data network. Rather, one purpose of the present invention is to provide a network independent architecture that allows voice communication to be established from a data interface over a data network irrespective of the type of device used to communicate to the network. Thus, the present invention envisions utilization of POTS, ISDN, ADSL and other types of connections to be used between voice capable devices, but utilizes a data network both as the communication channel, and as the initiator for connection between devices.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An apparatus for web initiated telephony between telephonic devices, the apparatus comprising:
   a user computer, having a data connection to a web server, for requesting the web server to initiate a telephonic connection between first and second telephonic devices coupled to a telephone network, said user computer requesting the web server to initiate the telephonic connection by specifying the first and second telephonic devices and a type of communication between the first and second telephonic devices; and
   a plurality of point of presence (POP) telephony servers, coupled to the telephone network, and coupled to said web server via a data network, said plurality of POP telephony servers for connecting to said first and second telephonic devices via both the telephone network and the data network upon a data command received from said web server via the data network wherein said plurality of POP telephony servers comprises conversion logic for receiving voice data and converting said received voice data to streaming audio for transmission over the data network and for receiving streaming audio over said data network and converting said received streaming audio to said voice data for transmission over the data network wherein by converting said voice data to said streaming audio, and by converting said streaming audio to said voice data, a two way connection between said plurality of telephonic devices is established over a data network;

wherein said data command is issued by said web server via the data network and via said one or more of the plurality of POP telephony servers to said first and second of telephonic devices in response to said web server being requested via the data connection between the user computer and the web server by a user controlling said user computer whereby the data command results in the initiation of the telephonic connection between the first and second telephonic devices via both the telephone network and the data network.

2. The apparatus for web initiated telephony as recited in claim 1 wherein said user computer comprises:
a personal computer;
a personal digital assistant (PDA); or
a set-top box.

3. The apparatus for web initiated telephony as recited in claim 1 wherein said data connection comprises an internet connection.

4. The apparatus for web initiated telephony as recited in claim 1 wherein said web server comprises a server on the internet, for receiving said requesting from said user computer, and for providing said data command to said plurality of telephonic devices.

5. The apparatus for web initiated telephony as recited in claim 1 wherein said telephonic connection comprises a voice to voice connection.

6. The apparatus for web initiated telephony as recited in claim 1 wherein said plurality of telephonic devices comprises:
land line telephones;
cellular telephones; or
personal digital assistants.

7. The apparatus for web initiated telephony as recited in claim 1 wherein said plurality of telephonic devices are coupled to said telephone network.

8. The apparatus for web initiated telephony as recited in claim 1 wherein said plurality of POP telephony servers are coupled to said plurality of telephonic devices via said telephone network, and to said web server via a data network.

9. The apparatus for web initiated telephony as recited in claim 1 wherein said data command by said web server comprises:
a telephone number pertaining to a selected telephonic device to be called; and
an IP address of a selected POP telephony server.

10. The apparatus for web initiated telephony as recited in claim 9 wherein said web server provides a data command to each of said plurality of POP telephony servers that are to initiate a telephonic connection.

11. The apparatus for web initiated telephony as recited in claim 1 wherein said user initiates said data command by selecting two or more of said plurality of telephonic devices to be connected by said web server.

12. The apparatus for web initiated telephony as recited in claim 1 wherein said user computer selects first and second telephonic devices for communication and provides said selection to said web server via the data network, said web server determining which of said telephony servers are associated with said first and second telephonic devices.

13. The apparatus for web initiated telephony as recited in claim 1 wherein the type of communication comprises one or more of the following: email, voice connection, and telephone conferencing.

14. A system for establishing voice communication between first and second telephone devices coupled to first and second telephone networks, the communication requested by a user computing device coupled to a data network, the system comprising:
a first telephony server, coupled to the first telephone network and to the data network;
a second telephony server, coupled to the second telephone network and to the data network;
a web server, coupled to the data network and coupled to said first and second telephony servers via the data network; and
a user computing device, coupled to the data network, for making a selection of the first and second telephone devices and a type of communication between the first and second telephone devices, and for providing said selection to said web server;
wherein, upon receipt of and in response to said selection of the first and second telephone devices and the type of communication from said user computing device, said web server is requested by the user computing device via the data network between the user computing device and the web server to issue data commands to said first and second telephony servers to call the first and second telephone devices, respectively, and to initiate voice communication between them via the first and second telephone networks and via the data network whereby said first and second telephone devices are connected via the first and second telephone networks and via the data network in response to a data command from said web server provided to said first and second telephony servers via said data network
wherein said first and second telephony servers comprise a data server, coupled to the data network, for sending and receiving streaming audio to and from said web server; and
voice/streaming audio conversion, coupled to said data server, for converting voice information to streaming audio format for transmission to said data server, and for converting streaming audio received from said data server to voice format wherein by converting said voice information to said streaming audio format, and by converting said streaming audio to said voice format, a two way connection between said plurality of telephonic devices is established over the data network.

15. The system as recited in claim 14 wherein the first and second telephone devices comprise:
land line telephones;
cellular telephones; or
other voice capable telephonic devices coupled to a telephone network.

16. The system as recited in claim 14 wherein said user computing device comprises:

a personal computer;
a laptop computer; or
a personal digital assistant.

17. The system as recited in claim 14 wherein the first and second telephone networks comprise local telephone switches coupled to the first and second telephone devices, respectively.

18. The system as recited in claim 14 wherein the data network comprises:
the internet;
a local area network; or
a wide area network.

19. The system as recited in claim 14 wherein the user computing device coupled to the data network comprises a server with an IP address.

20. The system as recited in claim 14 wherein said web server comprises:
a POP database, for storing an IP address for said first and second telephony servers, and for associating telephone numbers with either of said first or second telephony servers.

21. The system as recited in claim 14 wherein said web server further comprises:
streaming audio conversion, for converting streaming audio to and from other computer audio formats.

22. The system as recited in claim 21 wherein said other computer audio formats comprise Real Audio format.

23. The system as recited in claim 14 wherein said web server comprises text/speech conversion, for converting streaming audio to text format, and for converting text format to streaming audio.

24. The system as recited in claim 14 wherein said first and second telephony servers are located in different cities.

25. The system as recited in claim 14 wherein said voice communication between the first and second telephone devices is provided via the first and second telephone networks that are local to the first and second telephone devices, and via the data network for long distance connections.

26. The system as recited in claim 14 wherein the data network provides long distance voice communication without utilizing a long distance telephone network.

27. The system as recited in claim 14 wherein said user computing device selects said first and second telephone devices for communication, and provides said selection to said web server via the data network, said web server determining which of said first and second telephony servers are associated with said selected fist and second telephone devices.

28. The system as recited in claim 14 wherein the type of communication comprises one or more of the following: email, voice connection, and telephone conferencing.

29. A system for establishing voice communication between first and second telephone devices coupled to first and second telephone networks, said system comprising:
a user computing device coupled to a data network, for requesting the communication between the first and telephone devices;
a first telephony server, coupled to the first telephone network and to the data network;
a second telephony server, coupled to the second telephone network and to the data network;
a web server, coupled to the data network and coupled to said first and second telephony servers via the data network; and
said computing device for making a selection of the first and second telephone devices and a type of communication between the first and second telephone devices, and for providing said selection to said web server as a data command via the data network;
wherein, upon receipt of said data command indicating said selection from said user computing device, said web server commands said first and second telephony servers to call the first and second telephone devices, respectively, and to initiate voice communication between them via the first and second telephone networks and via the data network;
wherein said web server comprises a POP database for storing an IP address for said first and second telephony servers, and for associating telephone numbers with either of said first or second telephony servers; and
wherein when said user computing device selects said first and second telephone devices and the type of communication between the first and second telephone devices, and provides said selection to said web server, said web server determining which of said first and second telephony servers are associated with said selected first and second telephone devices;
wherein said first and second telephone servers comprise a data server, coupled to the data network, for sending and receiving streaming audio to and from said web server; and voice/streaming audio conversion, coupled to said data server, for converting voice information to streaming audio format for transmission to said data server, and for converting streaming audio received from said data server to voice format wherein by converting said voice information to said streaming audio format, and by converting said streaming audio to said voice format, a two way connection between said plurality of telephonic devices is established over the data network.

30. The system as recited in claim 29 wherein the type of communication comprises one or more of the following: email, voice connection, and telephone conferencing.

31. A long distance communication system for establishing voice communication between two or more telephony devices, each coupled to a telephone network, the communication system utilizing a data network as the long distance transmission medium, the communication system comprising:
a plurality of point of presence (POP) servers, each coupled to a telephone network, and to the data network;
a web server, coupled to said plurality of POP servers via the data network, said web server configured to receive information associated with the two or more telephony devices for selecting one or more POP servers from said plurality of POP servers, and for initiating voice communication between the two or more telephony devices via the telephone network and via the data network; and
a user communication initiation device, coupled to said web server via said data network, for providing a data command to said web server, said data command specifying the two or more telephony devices and a type of communication among the two or more telephony devices, said user communication initiation device further requesting the web server via the data network to initiate the voice communication between the two or more telephony devices via the telephone network and via the data network based on the data command;
wherein said plurality of POP telephony servers comprises conversion logic for receiving voice data and converting said received voice data to streaming audio for transmission over the data network and for receiving streaming audio over said data network and converting said received streaming audio to said voice data for transmission over the data network wherein by converting said voice data to said streaming audio, and by converting said streaming audio to said voice data, a two way connection between said plurality of telephonic devices is established over a data network.

32. The long distance communication system as recited in claim 31 wherein, upon data command from said web server, said selected one or more POP servers connect the two or more telephone networks.

33. The long distance communication system as recited in claim 32 wherein if more than one of said POP servers is selected, the communication system coupling said more than one POP servers is the data network.

34. The long distance communication system as recited in claim 31 wherein said communication initiation device comprises:
   a telephony device coupled to said web server via a data network; or
   a personal computing device.

35. The long distance communication system as recited in claim 31 wherein said communication initiation device selected from a predefined list ones of the two or more telephony devices for communication.

36. The long distance communication system as recited in claim 31 wherein said predefined list is stored on said web server.

37. The long distance communication system as recited in claim 31 wherein said selected information associated with the two or more telephony devices comprises telephone numbers of the two or more telephony devices.

38. The long distance communication system as recited in claim 31 wherein said user communication initiation device selects first and second telephonic devices for communication and provides said selection to said web server via the data network, said web server determining which of said telephony servers are associated with said first and second telephonic devices.

39. The long distance communication system as recited in claim 31 wherein the type of communication comprises one or more of the following: email, voice connection, and telephone conferencing.

40. A method for initiating voice communication between two telephony devices, utilizing telephone networks for local communication, and a data network for long distance communication, the method comprising:

a) selecting via a user computing device the two telephony devices to be connected;

b) providing by a data command from the user computing device via the data network information associated with the two telephony devices and a type of communication between the two telephony devices to a web server;

c) associating local telephony servers with the provided information;

d) commanding from the web server that the associated local telephony servers initiate communication with their associated telephony device via the data network;

wherein voice communication between the two telephony devices via at least one of the telephone networks and via the data network is initiated by the web server in response to said web server being provided with the data command; and e) converting voice information to streaming audio format for transmission over the data network, and for converting streaming audio received over the data network to voice format wherein by converting said voice information to said streaming audio format, and by converting said streaming audio to said voice format, a two way connection between the two telephony devices is established over the data network.

41. The method for initiating voice communication as recited in claim 40 wherein said selecting is performed via a personal computer device coupled to the data network.

42. The method for initiating voice communication as recited in claim 40 wherein the information associated with the two telephony devices comprises telephone numbers.

43. The method for initiating voice communication as recited in claim 42 wherein said associating relates the telephone numbers to IP addresses associated with the local telephony servers.

44. The method for initiating voice communication as recited in claim 40 wherein said web server receives an indication of the selected first and second telephony devices from the user computing device via the data network and determines the telephony server associated with each of said selected first and second telephony devices.

45. The method for initiating voice communication as recited in claim 40 wherein the type of communication comprises one or more of the following: email, voice connection, and telephone conferencing.

* * * * *

UNITED STATES PATENT AND TRADEMARK OFFICE
CERTIFICATE OF CORRECTION

PATENT NO. : 6,990,094 B1
APPLICATION NO. : 09/240434
DATED : January 24, 2006
INVENTOR(S) : Stephen O'Neal et al.

Page 1 of 1

It is certified that error appears in the above-identified patent and that said Letters Patent is hereby corrected as shown below:

In column 5, line 51, after "charged" delete ".".

In column 6, line 63, delete "modem" and insert -- modern --, therefor.

In column 8, line 4, delete "(VoIP)" and insert -- (VOIP) --, therefor.

In column 8, line 14, delete "(VoIP," and insert -- (VOIP, --, therefor.

In column 8, line 15, delete "VoIP" and insert -- VOIP --, therefor.

In column 8, line 32, after "etc.)" insert -- . --.

In column 14, line 46, in Claim 14, after "network" insert -- ; --.

In column 15, line 48, in Claim 27, delete "fist" and insert -- first --, therefor.

In column 15, line 57, in Claim 29, after "and" insert -- second --.

In column 16, line 22, in Claim 29, delete "telephone" and insert -- telephony --, therefor.

In column 17, line 26, in Claim 35, delete "ones" and insert -- one --, therefor.

In column 18, line 29, in Claim 41, delete "computer" and insert -- computing --, therefor.

Signed and Sealed this

Eighth Day of September, 2009

David J. Kappos
*Director of the United States Patent and Trademark Office*